US005441795A

United States Patent [19]

Malhotra et al.

[11] Patent Number: 5,441,795

[45] Date of Patent: Aug. 15, 1995

[54] RECORDING SHEETS CONTAINING PYRIDINIUM COMPOUNDS

[75] Inventors: Shadi L. Malhotra, Mississauga; Brent S. Bryant, Milton, both of Canada

[73] Assignee: Xerox Corporation, Stamford, Conn.

[21] Appl. No.: 33,917

[22] Filed: Mar. 19, 1993

[51] Int. Cl.$^{6}$ .................... B32B 3/00

[52] U.S. Cl. .................... 428/195; 428/207; 428/411.1; 428/421; 428/480; 428/483; 428/913

[58] Field of Search .................... 428/195, 421, 480, 483, 428/336, 913, 207, 411.1; 346/135.1

[56] References Cited

U.S. PATENT DOCUMENTS

| | | | |
|---|---|---|---|
| 4,446,174 | 5/1984 | Maekawa et al. | 427/261 |
| 4,554,181 | 11/1985 | Cousin et al. | 427/261 |
| 4,576,867 | 3/1986 | Miyamoto | 428/342 |
| 4,740,420 | 4/1988 | Akutsu et al. | 428/341 |
| 4,781,985 | 11/1988 | Desjarlais | 428/421 |
| 4,830,911 | 5/1989 | Kojima et al. | 428/342 |
| 4,877,680 | 10/1989 | Sakaki et al. | 428/332 |
| 4,946,741 | 8/1990 | Aono et al. | 428/195 |

FOREIGN PATENT DOCUMENTS

| | | |
|---|---|---|
| 0439363 | 7/1991 | European Pat. Off. . |
| 61-061895 | 3/1986 | Japan . |
| 62-035873 | 2/1987 | Japan . |
| 924610 | 7/1992 | South Africa . |

OTHER PUBLICATIONS

European Patent Publication No. WO 93/01938; "Ink Receptive Film Formulations"; Alan G. Miller; Feb. 4, 1993.

European Patent Publication No. 0199874; "Ink Jet Recording Sheet Having An Ink-Receptive Layer Containing Polyethylene Oxide"; Larry O. Hill; May 11, 1986.

Japanese Patent Application No. JP850169302; "Recording Liquid", Miura Konoe et al., Jun. 31, 1975.

Chemical Abstracts CA 107(2): 15666y JP 62035873—Hiroshi Feb. 1987.

Chemical Abstracts CA 105(16): 143683x JP 61061895, Ito Mar. 1986.

*Primary Examiner*—Patrick J. Ryan
*Assistant Examiner*—William A. Krynski
*Attorney, Agent, or Firm*—Judith L. Byorick

[57] ABSTRACT

Disclosed is a recording sheet which comprises a base sheet and a material selected from the group consisting of pyridinium compounds, piperazinium compounds, and mixtures thereof.

36 Claims, No Drawings

RECORDING SHEETS CONTAINING PYRIDINIUM COMPOUNDS

BACKGROUND OF THE INVENTION

The present invention is directed to recording sheets, such as transparency materials filled plastics papers and the like. More specifically, the present invention is directed to recording sheets particularly suitable for use in ink jet printing processes. One embodiment of the present invention is directed to a recording sheet which comprises (a) a base sheet; (b) a material selected from the group consisting of pyridinium compounds, piperazinium compounds, and mixtures thereof; (c) an optional pigment; and (d) an optional binder.

Recording sheets suitable for use in ink jet printing are known. For example, U.S. Pat. No. 4,740,420 (Akutsu et al.) discloses a recording medium for ink jet printing comprising a support material containing at least in the surface portion thereof a water soluble metal salt with the ion valence of the metal thereof being 2 to 4 and a cationic organic material. The cationic organic materials include salts of alkylamines, quaternary ammonium salts, polyamines, and basic latexes.

U.S. Pat. No. 4,576,867 (Miyamoto) discloses an ink jet recording paper with improved water resistance and sunlight fastness of the image formed on the paper wherein the recording paper has attached to its surface a cationic resin of the formula

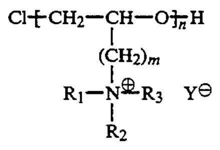

wherein $R_1$, $R_2$, and $R_3$ represent alkyl groups, m represents a number of 1 to 7, and n represents a number of 2 to 20, and Y represents an acid residue.

U.S. Pat. No. 4,446,174 (Maekawa et al.) discloses an ink jet recording method for producing a recorded image on an image receiving sheet with a jet of aqueous ink, wherein an ink jet is projected onto an image receiving sheet comprising a surface layer containing a pigment, and wherein the surface layer is capable of absorbing a coloring component in the aqueous ink. Poly (vinyl benzyl trimethyl ammonium chloride), poly (diallyl dimethyl ammonium chloride), and poly (methacryloxyethyl-β-hydroxyethyl dimethyl ammonium chloride) are disclosed as dye absorbing adhesive materials.

U.S. Pat. No. 4,830,911 (Kojima et al.) discloses a recording sheet for ink jet printers which gives an image by the use of an aqueous ink containing a water-soluble dye, coated or impregnated with either of or a mixture of two kinds of water soluble polymers, one whose polymeric unit is alkylquaternaryammonium (meth)acrylate and the other whose polymer unit is alkylquaternaryammonium (meth)acrylamide, wherein the water soluble polymers contain not less than 50 mol percent of a monomer represented by the formula

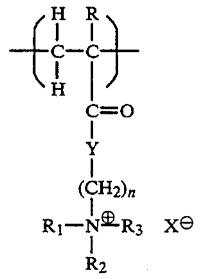

where R represents hydrogen or methyl group, n is an interger from 1 to 3 inclusive, $R_1$, $R_2$, and $R_3$ represent hydrogen or the same or different aliphatic alkyl group with 1 to 4 carbon atoms, X represents an anion such as a halogen ion, sulfate ion, alkyl sulfate ion, alkyl sulfonate ion, aryl sulfonate ion, and acetate ion, and Y represents oxygen or imino group.

U.S. Pat. No.4,554,181 (Cousin et al.) discloses an ink jet recording sheet having a recording surface which includes a combination of a water soluble polyvalent metal salt and a cationic polymer, the polymer having cationic groups which are available in the recording surface for insolubilizing an anionic dye.

U.S. Pat. No. 4,877,680 (Sakaki et al.) discloses a recording medium comprising a substrate and a nonporous ink receiving layer. The ink receiving layer contains a water-insoluble polymer containing a cationic resin. The recording medium may be employed for recording by attaching droplets of a recording liquid thereon.

European Patent Publication 0 439 363 A1, published Jul. 31, 1991, corresponding to copending application U.S. Ser. No. 07/469,985, filed Jan. 25, 1990, the disclosure of which is totally incorporated herein by reference, discloses a paper which comprises a supporting substrate with a coating comprising (a) a desizing component selected from the group consisting of (1) hydrophilic poly(dialkylsiloxanes); (2) poly(alkylene glycol); (3) poly(propylene oxide)-poly(ethylene oxide) copolymers; (4) fatty ester modified compounds of phosphate, sorbitan, glycerol, poly(ethylene glycol), sulfosuccinic acid, sulfonic acid and alkyl amine; (5) poly(oxyalkylene) modified compounds of sorbitan esters, fatty amines, alkanol amides, castor oil, fatty acids and fatty alcohols; (6) quaternary alkosulfate compounds; (7) fatty imidazolines; and mixtures thereof, and (b) a hydrophilic binder polymer. The binder polymer may be a quaternary ammonium copolymer such as Mirapol WT, Mirapol AD-1, Mirapol AZ-1, Mirapol A-15, Mirapol-9, Merquat-100, or Merquat-550, available from Miranol Incorporated.

Copending application U.S. Ser. No. 07/861,670, filed Apr. 1, 1992, the disclosure of which is totally incorporated herein by reference, discloses a recording sheet which comprises a substrate and a coating consisting essentially of (1) quaternary ammonium polymers selected from the group consisting of (a) polymers of Formula I

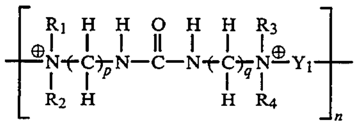

I wherein n is an integer of from 1 to about 200, $R_1$, $R_2$, $R_3$, and $R_4$ are each independently selected from the group consisting of alkyl groups, hydroxyalkyl groups, and polyoxyalkylene groups, p is an integer of from 1 to about 10, q is an integer of from 1 to about 10, X is an anion, and $Y_1$ is selected from the group consisting of $-CH_2CH_2OCH_2CH_2-$, $-CH_2CH_2OCH_2CH_2OCH_2CH_2-$, $-(CH_2)_k-$, wherein k is an integer of from about 2 to about 10, and $-CH_2CH(OH)CH_2-$; (b) polymers of Formula II

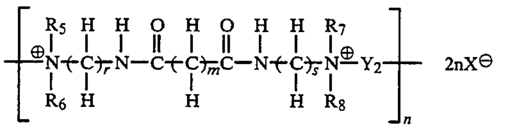

II wherein wherein n is an integer of from 1 to about 200, $R_5$, $R_6$, $R_7$, and $R_8$ are each independently selected from the group consisting of alkyl groups, hydroxyalkyl groups, and polyoxyalkylene groups, m is an integer of from 0 to about 40, r is an integer of from 1 to about 10, s is an integer of from 1 to about 10, X is an anion, and $Y_2$ is selected from the group consisting of $-CH_2CH_2OCH_2CH_2-$, $-CH_2CH_2OCH_2CH_2OCH_2CH_2-$, $-(CH_2)_k-$, wherein k is an integer of from about 2 to about 10, and $-CH_2CH(OH)CH_2-$; (c) copolymers of Formula III

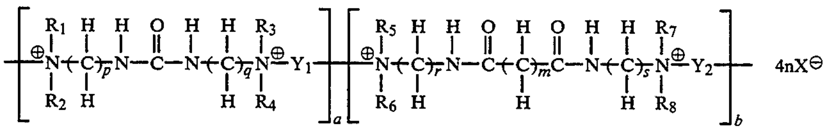

III wherein a and b are each integers wherein the sum of a+b is from about 2 to about 200, $R_1$, $R_2$, $R_3$, $R_4$, $R_5$, $R_6$, $R_7$, and $R_8$ are each independently selected from the group consisting of alkyl groups, hydroxyalkyl groups, and polyoxyalkylene groups, p is an integer of from 1 to about 10, q is an integer of from 1 to about 10, X is an anion, and $Y_1$ and $Y_2$ are each independently selected from the group consisting of $-CH_2CH_2OCH_2CH_2-$, $-CH_2CH_2OCH_2CH_2OCH_2CH_2-$, $-(CH_2)_k-$, wherein k is an integer of from about 2 to about 10, and $-CH_2CH(OH)CH_2-$; (d) mixtures of polymers of Formula I and polymers of Formula II; (e) mixtures of polymers of Formula I and copolymers of Formula III; (f) mixtures of polymers of Formula II and copolymers of Formula III; and (g) mixture of polymers of Formula I, polymers of Formula II, and copolymers of Formula III; (2) an optional binder polymer; and (3) an optional filler.

Copending application U.S. Ser. No. 07/861,668, filed Apr. 1, 1992, the disclosure of which is totally incorporated herein by reference, discloses a recording sheet which comprises a substrate; a first coating in contact with the substrate which comprises a crosslinking agent selected from the group consisting of hexamethoxymethyl melamine, methylated melamine-formaldehyde, methylated urea-formaldehyde, cationic urea-formaldehyde, cationic polyamine-epichlorohydrin, glyoxal-urea resin, poly(aziridine), poly(acrylamide), poly(N,N-dimethyl acrylamide), acrylamideacrylic acid copolymer, poly(2-acrylamido-2-methyl propane sulfonic acid), poly(N,N-dimethyl-3,5-dimethylene piperidinium chloride), poly(methyleneguanidine)hydrochloride, poly(ethylene imine) poly(ethylene imine)epichlorohydrin, poly(ethylene imine)ethoxylated, glutaraldehyde, and mixtures thereof; a catalyst; and a polymeric material capable of being crosslinked by the crosslinking agent and selected from the group consisting of polysaccharides having at least one hydroxy group, polysaccharides having at least one carboxy group, polysaccharides having at least one sulfate group, polysaccharides having at least one amine or amino group, polysaccharide gums, poly (alkylene oxides), vinyl polymers, and mixtures thereof; and a second coating in contact with the first coating which comprises a binder and a material selected from the group consisting of fatty imidazolines, ethosulfate quaternary compounds, dialkyl dimethyl methosulfate quaternary compounds, alkoxylated di-fatty quaternary compounds, amine oxides, amine ethoxylates, Imidazoline quaternary compounds, alkyl benzyl dimethyl quaternary compounds, poly (epiamines), and mixtures thereof.

While known compositions and processes are suitable for their intended purposes, a need remains for improved recording sheets. In addition, there is a need for improved recording sheets suitable for use in ink jet printing processes. Further, a need remains for recording sheets for ink jet printing with a high degree of waterfastness. Additionally, there is a need for paper recording sheets for ink jet printing with reduced showthrough of the images on the side of the paper opposite to that printed. There is also a need for recording sheets for ink jet printing with enhanced optical density.

SUMMARY OF THE INVENTION

It is an object of the present invention to provide recording sheets with the above noted advantages.

It is another object of the present invention to provide recording sheets suitable for use in ink jet printing processes.

It is yet another object of the present invention to provide recording sheets recording sheets for ink jet printing with a high degree of waterfastness.

It is still another object of the present invention to provide paper recording sheets for ink jet printing with reduced showthrough of the images on the side of the paper opposite to that printed.

Another object of the present invention is to provide recording sheets for ink jet printing with enhanced optical density.

These and other objects of the present invention (or specific embodiments thereof) can be achieved by providing a recording sheet which comprises (a) a base sheet; (b) a material selected from the group consisting of pyridinium compounds, piperazinium compounds, and mixtures thereof; (c) an optional pigment; and (d) an optional binder.

DETAILED DESCRIPTION OF THE INVENTION

The recording sheets of the present invention comprise a substrate and at least one material selected from the group consisting of pyridinium compounds, piperazinium compounds, and mixtures thereof on one or both surfaces of the substrate. Any suitable substrate can be employed. Examples include transparent materials, such as polyester, including Mylar™, available from E. I. Du Pont de Nemours & Company, Melinex™, available from Imperial Chemicals, Inc., Celanar™, available from Celanese Corporation, polycarbonates such as Lexan™, available from General Electric Company, polysulfones, such as those available from Union Carbide Corporation, polyether sulfones, such as those prepared from 4,4'-diphenyl ether, such as Udel™, available from Union Carbide Corporation, those prepared from disulfonyl chloride, such as Victrex™, available from ICI America Incorporated, those prepared from biphenylene, such as Astrel™, available from 3M Company, poly(arylene sulfones), such as those prepared from crosslinked poly(arylene ether ketone sulfones), cellulose triacetate, polyvinylchloride cellophane, polyvinyl fluoride, polyimides, and the like, with polyester such as Mylar™ being preferred in view of its availability and relatively low cost. The substrate can also be opaque, including opaque plastics, such as Teslin™, available from PPG Industries, and filled polymers, such as Melinex®, available from ICI. Filled plastics can also be employed as the substrate, particularly when it is desired to make a "never-tear paper" recording sheet. Paper is also suitable, including plain papers such as Xerox® 4024, diazo papers, or the like.

In one embodiment of the present invention, the substrate comprises sized blends of hardwood kraft and softwood kraft fibers containing from about 10 to 90 percent by weight soft wood and from about 10 to about 90 percent by weight hardwood. Examples of hardwood include Seagull W dry bleached hardwood kraft, present in one embodiment in an amount of about 70 percent by weight. Examples of softwood include La Tuque dry bleached softwood kraft, present in one embodiment in an amount of about 30 percent by weight. These substrates can also contain fillers and pigments in any effective amounts, typically from about 1 to about 60 percent by weight, such as clay (available from Georgia Kaolin Company, Astro-fil 90 clay, Engelhard Ansilex clay), titanium dioxide (available from Tioxide Company—Anatase grade AHR), calcium silicate CH-427-97-8, XP-974 (J. M. Huber Corporation), and the like. The sized substrates can also contain sizing chemicals in any effective amount, typically from about 0.25 percent to about 25 percent by weight of pulp, such as acidic sizing, including Mon size (available from Monsanto Company), alkaline sizing such as Hercon-76 (available from Hercules Company), Alum (available from Allied Chemicals as Iron free alum), retention aid (available from Allied Colloids as Percol 292), and the like. The preferred internal sizing degree of papers selected for the present invention, including commercially available papers, varies from about 0.4 to about 5,000 seconds, and papers in the sizing range of from about 0.4 to about 300 seconds are more preferred, primarily to decrease costs. Preferably, the selected substrate is porous, and the porosity value of the selected substrate preferably varies from about 100 to about 1,260 milliliters per minute and preferably from about 50 to about 600 milliliters per minute to enhance the effectiveness of the recording sheet in ink jet processes. Preferred basis weights for the substrate are from about 40 to about 400 grams per square meter, although the basis weight can be outside of this range.

Illustrative examples of commercially available internally and externally (surface) sized substrates suitable for the present invention include Diazo papers, offset papers, such as Great Lakes offset, recycled papers, such as Conservatree, office papers, such as Automimeo, Eddy liquid toner paper and copy papers available from companies such as Nekoosa, Champion, Wiggins Teape, Kymmene, Modo, Domtar, Veitsiluoto and Sanyo, and the like, with Xerox® 4024™ papers and sized calcium silicate-clay filled papers being particularly preferred in view of their availability, reliability, and low print through. Pigmented filled plastics, such as Teslin (available from PPG industries), are also preferred as supporting substrates.

The substrate can be of any effective thickness. Typical thicknesses for the substrate are from about 50 to about 500 microns, and preferably from about 100 to about 125 microns, although the thickness can be outside these ranges.

Situated on the substrate of the present invention is one or more pyridinium compounds or piperazinium compounds. Pyridinium compounds are of the general formula

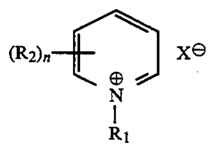

wherein $R_1$ is a moiety bound to the nitrogen atom and is selected from the group consisting of hydrogen, alkyl groups, preferably with from 1 to about 35 carbon atoms, including cyclic alkyl groups, such as cyclopropyl, cyclohexyl, and the like, and including unsaturated alkyl groups, such as vinyl ($H_2C{=}CH{-}$), allyl ($H_2C{=}CH{-}CH_2{-}$), propynyl ($HC{\equiv}C{-}CH_2{-}$), and the like, substituted alkyl groups, preferably with from 1 to about 25 carbon atoms, aryl groups, preferably with from 6 to about 15 carbon atoms, substituted aryl groups, preferably with from 6 to about 25 carbon atoms, more preferably with from 6 to about 15 carbon atoms, arylalkyl groups, preferably with from 7 to about 15 carbon atoms, such as benzyl and the like, and substituted arylalkyl groups, preferably with from 7 to about 15 carbon atoms, $R_2$ is a moiety bound to the ring at an atom other than nitrogen and is selected from the group consisting of hydrogen, alkyl groups, preferably with from 1 to about 35 carbon atoms, including cyclic alkyl groups, such as cyclopropyl, cyclohexyl, and the like, and including unsaturated alkyl groups, such as vinyl ($H_2C{=}CH{-}$), allyl ($H_2C{=}CH{-}CH_2{-}$), propynyl ($HC{\equiv}C{-}CH_2{-}$), and the like, substituted alkyl groups, preferably with from 1 to about 25 carbon atoms, aryl groups, preferably with from 6 to about 15 carbon atoms, substituted aryl groups, preferably with from 6 to about 15 carbon atoms, arylalkyl groups, preferably with from 7 to about 15 carbon atoms, such as benzyl and the like, and substituted arylalkyl groups, preferably with from 7 to about 15 carbon atoms, n represents the number of $R_2$ substituents on the ring, and X is an anion. Examples of suitable substituents on $R_1$ and $R_2$ include silyl groups, halide atoms, such as fluoride, chloride, bromide, iodide, and astatide, nitro groups, amine groups, including primary, secondary, and tertiary amines, hydroxy groups, alkoxy or ether groups, aldehyde groups, ketone groups, ester groups, amide groups, carboxylic acid groups, and the like. Any suitable anion can be employed. Examples of suitable anions include halide anions, such as fluoride, chloride, bromide, iodide, and astatide, sulfate, alkosulfate, such as methylsulfate and ethosulfate, sulfite, phosphate, phosphite, perhalate, such as perchlorate, perbromate, periodate, and the like, halate, such as chlorate and the like, halite, such as bromite and the like, fluoroborate, and the like.

Examples of suitable pyridinium compounds include 1-(carboxymethyl)pyridinium chloride (Aldrich 15274-9), of the formula

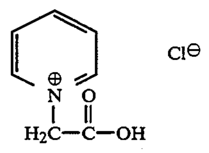

1-(carboxymethyl)pyridinium chloride hydrazide (Girards Reagent, Aldrich 12,451-6), of the formula

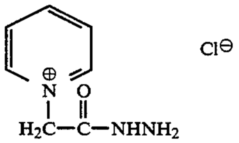

1-(3-sulfopropyl)pyridinium hydroxide (Aldrich 25, 167-4), of the formula

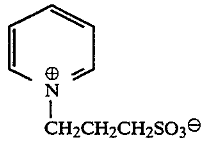

1-(3-nitrobenzyloxymethyl)pyridinium chloride (Aldrich 22,031-0), of the formula

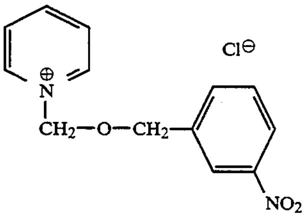

1-dodecyl pyridinium chloride monohydrate (Aldrich 27,860-2), of the formula

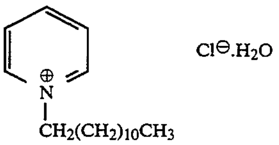

N-(lauroyl colamino formyl methyl)pyridinium chloride (Emcol E-607L, available from Witco Chemical Ltd.), of the formula

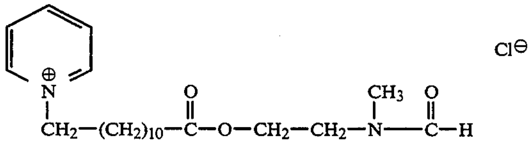

N-(stearoyl colamine formyl methyl)pyridinium chloride (Emcol E-607S, available from Witco Chemical Ltd.), of the formula

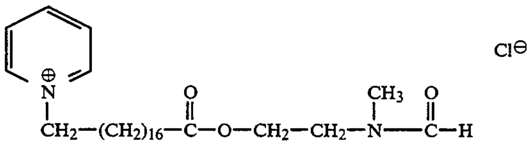

1-hexadecyl pyridinium bromide monohydrate (also called 1-cetyl pyridinium bromide monohydrate, Aldrich 28,531-5, Acetoquat CPB, Aceto Chemical) and 1-hexadecyl pyridinium chloride monohydrate (also called 1-cetyl pyridinium chloride monohydrate, Aldrich 85,556-1, Acetoquat CPC, Aceto Chemical), of the formulae

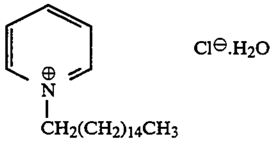
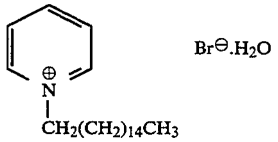

1,2-disubstituted pyridinium compounds, such as 2-chloro- 1-methyl pyridinium iodide (Aldrich 19,800-5), of the formula

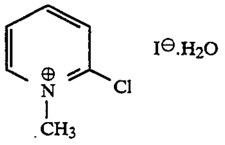

ps 2-pyridine aldoxime-1-methyl methane sulfonate (Aldrich P6,060-4) and 2-pyridine aldoxime-1-methyl chloride (Aldrich P6,020-5), of the formulae

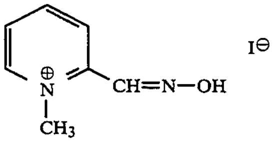

-continued

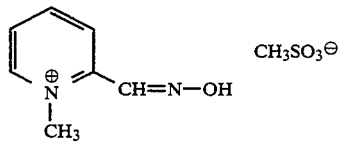

2-[4-(dimethyl amino) styryl]1-ethylpyridinium iodide (Aldrich 28,012-7), of the formula

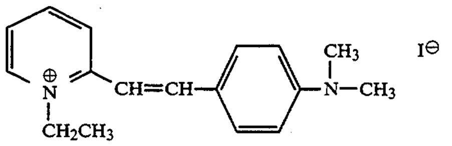

and the like, 1,3-disubstituted pyridinium compounds, such as 1-ethyl-3hydroxy pyridinium bromide (Aldrich 19,264-3), of the formula

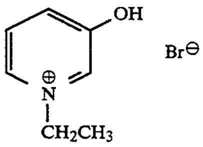

1-benzyl-3-hydroxy pyridinium chloride (Aldrich B2,313-1), of the formula

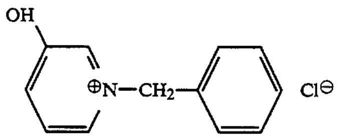

and the like, 1,4-disubstituted pyridinium compounds, such as 1,4 dimethyl pyridinium iodide (Aldrich 37,643-4), of the formula

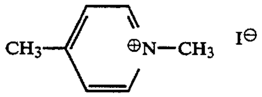

1-ethyl-4-(methoxy carbonyl) pyridinium iodide (Aldrich 32,625-9), of the formula

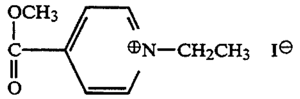

1-ethyl-4-phenyl pyridinium iodide (Aldrich 36,208-5), of the formula

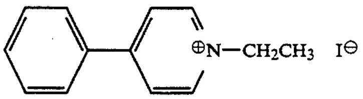

4-phenyl-1-propyl pyridinium iodide (Aldrich 36,215-8), of the formula

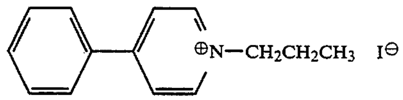

1-heptyl-4-(4-pyridyl) pyridinium bromide (Aldrich 37,778-3), of the formula

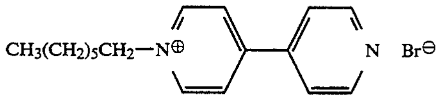

1-docosyl-4-(4 hydroxystyryl) pyridinium bromide (Aldrich 36,684-6), of the formula

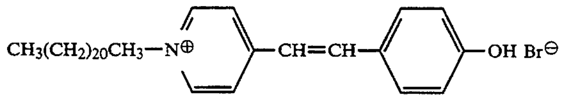

and the like, substituted bipyridinium compounds, such as 1,1'-dimethyl-4-4'-bipyridinium dichloride (Aldrich 85,617-7), of the formula

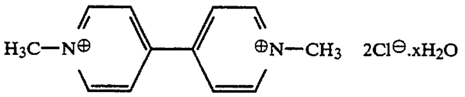

1,1'-diethyl-4-4'-bipyridinium dibromide (Aldrich 38,409-7), of the formula

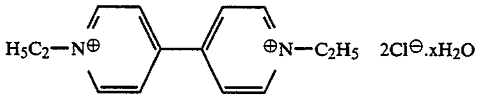

1,1'-dibenzyl-4,4'-bipyridinium dichloride (Aldrich 27,184-5), of the formula

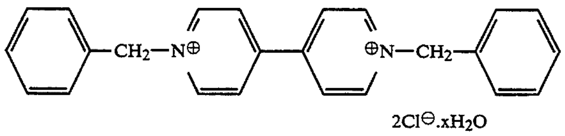

1,1'-diheptyl-4,4'-bipyridinium dibromide (Aldrich 18,085-8), of the formula

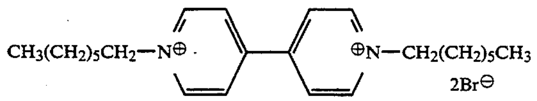

and the like.

Piperazinium compounds are of the general formulae

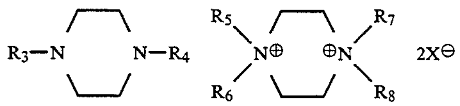

-continued

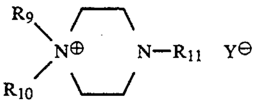

wherein $R_3$, $R_4$, $R_5$, $R_6$, $R_7$, $R_8$, $R_9$, $R_{10}$, and $R_{11}$ are independently selected from the group consisting of hydrogen, alkyl groups, preferably with from 1 to about 35 carbon atoms, including cyclic alkyl groups, such as cyclopropyl, cyclohexyl, and the like, and including unsaturated alkyl groups, such as vinyl ($H_2C{=}CH—$), allyl ($H_2C{=}CH—CH_2—$), propynyl ($HC{\equiv}C—CH_2—$), and the like, substituted alkyl groups, preferably with from 1 to about 25 carbon atoms, aryl groups, preferably with from 6 to about 15 carbon atoms, substituted aryl groups, preferably with from 6 to about 15 carbon atoms, arylalkyl groups, preferably with from 7 to about 25 carbon atoms, such as benzyl and the like, substituted arylalkyl groups, preferably with from 7 to about 15 carbon atoms, and Y is an anion. Examples of suitable substituents on $R_1$ through $R_9$ include silyl groups, halide atoms, such as fluoride, chloride, bromide, iodide, and astatide, nitro groups, amine groups, including primary, secondary, and tertiary amines, hydroxy groups, alkoxy or ether groups, aldehyde groups, ketone groups, ester groups, amide groups, carboxylic acid groups, and the like. Any suitable anion can be employed. Examples of suitable anions include halide anions, such as fluoride, chloride, bromide, iodide, and astatide, sulfate, alkosulfate, such as methylsulfate and ethylsulfate, sulfite, phosphate, phosphite, perhalate, such as perchlorate, perbromate, periodate, and the like, halate, such as chlorate and the like, halite, such as bromite and the like, fluoroborate, and the like.

Examples of suitable piperazinium compounds include 1-amino-4-methyl piperazine dihydrochloride monohydrate (Aldrich A6,513-1), of the formula

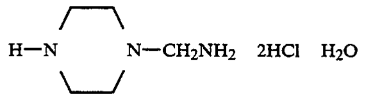

1-(3-chloropropyl)-piperazine dihydrochloride monohydrate (Aldrich 19,360-7), of the formula

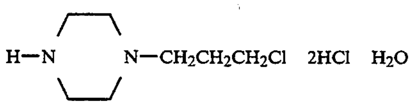

1-(2,3-xylyl) piperazine monohydrochloride (Aldrich 27,518-2), of the formula

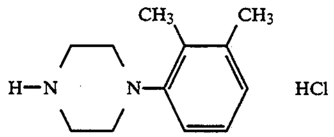

1,1-dimethyl-4-phenyl piperazineium iodide (Aldrich D17,750-4), of the formula

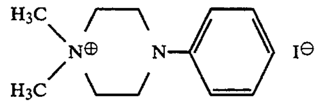

and the like.

Mixtures of any two or more pyridinium or piperazinium compounds can also be employed.

The pyridinium or piperazinium compound is present in any effective amount relative to the substrate. Typically, the pyridinium or piperazinium compound is present in an amount of from about 1 to about 25 percent by weight of the substrate, preferably from about 2 to about 10 percent by weight of the substrate, although the amount can be outside this range. The amount can also be expressed in terms of the weight of pyridinium or piperazinium compound per unit area of substrate. Typically, the pyridinium or piperazinium compound is present in an amount of from about 1 to about 10 grams per square meter of the substrate surface to which it is applied, and preferably from about 1 to about 5 grams per square meter of the substrate surface to which it is applied, although the amount can be outside these ranges. Higher concentrations of pyridinium or piperazinium compound are preferred for the purpose of enhancing the color of images printed on the recording sheets; the lower concentrations are adequate for enhancing the waterfastness of images printed on the recording sheets.

When the pyridinium or piperazinium compound is applied to the substrate as a coating, the coatings employed for the recording sheets of the present invention can include an optional binder in addition to the pyridinium or piperazinium compound. Examples of suitable binder polymers include (a) hydrophilic polysaccharides and their modifications, such as (1) starch (such as starch SLS-280, available from St. Lawrence starch), (2) cationic starch (such as Cato-72, available from National Starch), (3) hydroxyalkylstarch, wherein alkyl has at least one carbon atom and wherein the number of carbon atoms is such that the material is water soluble, preferably from about 1 to about 20 carbon atoms, and more preferably from about 1 to about 10 carbon atoms, such as methyl, ethyl, propyl, butyl, or the like (such as hydroxypropyl starch (#02382, available from Poly Sciences Inc.) and hydroxyethyl starch (#06733, available from Poly Sciences Inc.)), (4) gelatin (such as Calfskin gelatin #00639, available from Poly Sciences Inc.), (5) alkyl celluloses and aryl celluloses, wherein alkyl has at least one carbon atom and wherein the number of carbon atoms is such that the material is water soluble, preferably from 1 to about 20 carbon atoms, more preferably from 1 to about 10 carbon atoms, and even more preferably from 1 to about 7 carbon atoms, such as methyl, ethyl, propyl, butyl, pentyl, hexyl, benzyl, and the like (such as methyl cellulose (Methocel AM 4, available from Dow Chemical Company)), and wherein aryl has at least 6 carbon atoms and wherein the number of carbon atoms is such that the material is water soluble, preferably from 6 to about 20 carbon atoms, more preferably from 6 to about 10 carbon atoms, and even more preferably about 6 carbon atoms, such as phenyl, (6) hydroxy alkyl celluloses, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as hydroxyethyl cellulose (Natrosol 250 LR, available from Hercules Chemical Company), and hydroxypropyl cellulose (Klucel Type E, available from Hercules Chemical Company)), (7) alkyl hydroxy alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as ethyl hydroxyethyl cellulose (Bermocoll, available from Berol Kem. A.B. Sweden)), (8) hydroxy alkyl alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxyethyl methyl cellulose (HEM, available from British Celanese Ltd., also available as Tylose MH, MHK from Kalle A.G.), hydroxypropyl methyl cellulose (Methocel K35LV, available from Dow Chemical Company), and hydroxy butylmethyl cellulose (such as HBMC, available from Dow Chemical Company)), (9) dihydroxyalkyl cellulose, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dihydroxypropyl cellulose, which can be prepared by the reaction of 3-chloro-1,2-propane with alkali cellulose), (10) hydroxy alkyl hydroxy alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxypropyl hydroxyethyl cellulose, available from Aqualon Company), (11) halodeoxycellulose, wherein halo represents a halogen atom (such as chlorodeoxycellulose, which can be prepared by the reaction of cellulose with sulfuryl chloride in pyridine at 25° C.), (12) amino deoxycellulose (which can be prepared by the reaction of chlorodeoxy cellulose with 19 percent alcoholic solution of ammonia for 6 hours at 160° C.), (13) dialkylammonium halide hydroxy alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as diethylammonium chloride hydroxy ethyl cellulose, available as Celquat H-100, L-200, National Starch and Chemical Company), (14) hydroxyalkyl trialkyl ammonium halide hydroxyalkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as hydroxypropyl trimethyl ammonium chloride hydroxyethyl cellulose, available from Union Carbide Company as Polymer JR), (15) dialkyl amino alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, (such as diethyl amino ethyl cellulose, available from Poly Sciences Inc. as DEAE cellulose #05178), (16) carboxyalkyl dextrans, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, and the like, (such as carboxymethyl dextrans, available from Poly Sciences Inc. as #16058), (17) dialkyl aminoalkyl dextran, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as diethyl aminoethyl dextran, available from Poly Sciences Inc. as #5178), (18) amino dextran (available from Molecular Probes Inc), (19) carboxy alkyl cellulose salts, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethyl cellulose CMC 7HOF, available from Hercules Chemical Company), (20) gum arabic (such as #G9752, available from Sigma Chemical Company), (21) carrageenan (such as #C1013 available from Sigma Chemical Company), (22) Karaya gum (such as #G0503, available from Sigma Chemical Company), (23) xanthan (such as Keltrol-T, available from Kelco division of Merck and Company), (24) chitosan (such as #C3646, available from Sigma Chemical Company), (25) carboxyalkyl hydroxyalkyl guar, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as carboxymethyl hydroxypropyl guar, available from Auqualon Company), (26) cationic guar (such as Celanese Jaguars C-14-S, C-15, C-17, available from Celanese Chemical Company), (27) n-carboxyalkyl chitin, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, such as n-carboxymethyl chitin, (28) dialkyl ammonium hydrolyzed collagen protein, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dimethyl ammonium hydrolyzed collagen protein, available from Croda as Croquats), (29) agar-agar (such as that available from Pfaltz and Bauer Inc), (30) cellulose sulfate salts, wherein the cation is any conventional cation, such as sodium, lithium, potassium, calcium, magnesium, or the like (such as sodium cellulose sulfate #023 available from Scientific Polymer Products), and (31) carboxyalkylhydroxyalkyl cellulose salts, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethylhydroxyethyl cellulose CMHEC 43H and 37L available from Hercules Chemical Company); (b) vinyl polymers, such as (1) poly(vinyl alcohol) (such as Elvanol available from Dupont Chemical Company), (2) poly (vinyl phosphate) (such as #4391 available from Poly Sciences Inc.), (3) poly (vinyl pyrrolidone) (such as that available from GAF Corporation), (4) vinyl pyrrolidone-vinyl acetate copolymers (such as #02587, available from Poly Sciences Inc.), (5) vinyl pyrrolidone-styrene copolymers (such as #371, available from Scientific Polymer Products), (6) poly (vinylamine) (such as #1562, available from Poly Sciences Inc.), (7) poly (vinyl alcohol) alkoxylated, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as poly (vinyl alcohol) ethoxylated #6573, available from Poly Sciences Inc.), and (8) poly (vinyl pyrrolidone-dialkylaminoalkyl alkylacrylate), wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as poly (vinyl pyrrolidone-diethylaminomethylmethacrylate) #16294 and #16295, available from Poly Sciences Inc.); (c) formaldehyde resins, such as (1) melamine-formaldehyde resin (such as BC 309, available from British Industrial Plastics Limited), (2) urea-formaldehyde resin (such as BC777, available from British Industrial Plastics Limited), and (3) alkylated urea-formaldehyde resins, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methylated urea-formaldehyde resins, available from American Cyanamid Company as Beetle 65); (d) ionic polymers, such as (1) poly (2-acrylamide-2-methyl propane sulfonic acid) (such as #175 available from Scientific Polymer Products), (2) poly (N,N-dimethyl-3,5-dimethylene piperidinium chloride) (such as #401, available from Scientific Polymer Products), and (3) poly (methylene-guanidine) hydrochloride (such as #654, available from Scientific Polymer Products); (e) latex polymers, such as (1) cationic, anionic, and nonionic styrene-butadiene latexes (such as that available from Gen Corp Polymer Products, such as RES 4040 and RES 4100, available from Unocal Chemicals, and such as DL 6672A, DL6638A, and DL6663A, available from Dow Chemical Company), (2) ethylenevinylacetate latex (such as Airflex 400, available from Air Products and Chemicals Inc.), and (3) vinyl acetate-acrylic copolymer latexes (such as synthemul 97-726, available from Reichhold Chemical Inc, Resyn 25-1110 and Resyn 25-1140, available from National Starch Company, and RES 3103 available from Unocal Chemicals; (f) maleic anhydride and maleic acid containing polymers, such as (1) styrene-maleic anhydride copolymers (such as that available as Scripset from Monsanto, and the SMA series available from Arco), (2) vinyl alkyl ether-maleic anhydride copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinyl methyl ether-maleic anhydride copolymer #173, available from Scientific Polymer Products), (3) alkylene-maleic anhydride copolymers, wherein alkylene has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as ethylene-maleic anhydride copolymer #2308, available from Poly Sciences Inc., also available as EMA from Monsanto Chemical Company), (4) butadiene-maleic acid copolymers (such as #07787, available from Poly Sciences Inc.), (5) vinylalkyletheromaleic acid copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinylmethylether-maleic acid copolymer, available from GAF Corporationas Gantrez S-95), and (6) alkyl vinyl ether-maleic acid esters, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methyl vinyl ethermaleic acid ester #773, available from Scientific Polymer Products); (g) acrylamide containing polymers, such as (1) poly (acrylamide) (such as #02806, available from Poly Sciences Inc.), (2) acrylamide-acrylic acid copolymers (such as #04652, #02220, and #18545, available from Poly Sciences Inc.), and (3) poly (N,N-dimethyl acrylamide) (such as #004590, available from Poly Sciences Inc.); and (h) poly (alkylene imine) containing polymers, wherein alkylene has two (ethylene), three (propylene), or four (butylene) carbon atoms, such as (1) poly(ethylene imine) (such as #135, available from Scientific Polymer Products), (2) poly(ethylene imine) epichlorohydrin (such as #634, available from Scientific Polymer Products), and (3) alkoxylated poly (ethylene imine), wherein alkyl has one (methoxylated), two (ethoxylated), three (propoxylated), or four (butoxylated) carbon atoms (such as ethoxylated poly (ethylene imine #636, available from Scientific Polymer Products); and the like, as well as blends or mixtures of any of the above, with starches and latexes being particularly preferred because of their availability and applicability to paper. Any mixtures of the above ingredients in any relative amounts can be employed.

If present, the binder can be present within the coating in any effective amount; typically the binder and the pyridinium or piperazinium compound are present in relative amounts of from about 10 parts by weight binder and about 90 parts by weight pyridinium or piperazinium compound to about 50 parts by weight binder and about 50 parts by weight pyridinium or piperazinium compound, although the relative amounts can be outside of this range.

In addition, the coating of the recording sheets of the present invention can contain optional filler components. Fillers can be present in any effective amount, and if present, typically are present in amounts of from about 1 to about 60 percent by weight of the coating composition. Examples of filler components include colloidal silicas, such as Syloid 74, available from Grace Company (preferably present, in one embodiment, in an amount of about 20 weight percent), titanium dioxide (available as Rutlie or Anatase from NL Chem Canada, Inc.), hydrated alumina (Hydrad TMC-HBF, Hydrad TM-HBC, available from J. M. Huber Corporation), barium sulfate (K. C. Blanc Fix HD80, available from Kali Chemie Corporation), calcium carbonate (Microwhite Sylacauga Calcium Products), high brightness clays (such as Engelhard Paper Clays), calcium silicate (available from J. M. Huber Corporation), cellulosic materials insoluble in water or any organic solvents (such as those available from Scientific Polymer Products), blend of calcium fluoride and silica, such as Opalex-C available from Kemira.O.Y, zinc oxide, such as Zoco Fax 183, available from Zo Chem, blends of zinc sulfide with barium sulfate, such as Lithopane, available from Schteben Company, and the like, as well as mixtures thereof. Brightener fillers can enhance color mixing and assist in improving print-through in recording sheets of the present invention.

The coating containing the pyridinium or piperazinium compound is present on the substrate of the recording sheet of the present invention in any effective thickness. Typically, the total thickness of the coating layer is from about 1 to about 25 microns and preferably from about 2 to about 10 microns, although the thickness can be outside of these ranges.

The pyridinium or piperazinium compound or the mixture of pyridinium or piperazinium compound, optional binder, and/or optional filler can be applied to the substrate by any suitable technique, such as size press treatment, dip coating, reverse roll coating, extrusion coating, or the like. For example, the coating can be applied with a KRK size press (Kumagai Riki Kogyo Co., Ltd., Nerima, Tokyo, Japan) by dip coating and can be applied by solvent extrusion on a Faustel Coater. The KRK size press is a lab size press that simulates a commercial size press. This size press is normally sheet fed, whereas a commercial size press typically employs a continuous web. On the KRK size press, the substrate sheet is taped by one end to the carrier mechanism plate. The speed of the test and the roll pressures are set, and the coating solution is poured into the solution tank. A 4 liter stainless steel beaker is situated underneath for retaining the solution overflow. The coating solution is cycled once through the system (without moving the substrate sheet) to wet the surface of the rolls and then returned to the feed tank, where it is cycled a second time. While the rolls are being "wetted", the sheet is fed through the sizing rolls by pressing the carrier mechanism start button. The coated sheet is then removed from the carrier mechanism plate and is placed on a 12 inch by 40 inch sheet of 750 micron thick Teflon for support and is dried on the Dynamic Former drying drum and held under restraint to prevent shrinkage. The drying temperature is approximately 105° C. This method of coating treats both sides of the substrate simultaneously.

In dip coating, a web of the material to be coated is transported below the surface of the liquid coating composition by a single roll in such a manner that the exposed site is saturated, followed by removal of any excess coating by the squeeze rolls and drying at 100° C. in an air dryer. The liquid coating composition generally comprises the desired coating composition dissolved in a solvent such as water, methanol, or the like. The method of surface treating the substrate using a coater results in a continuous sheet of substrate with the coating material applied first to one side and then to the second side of this substrate. The substrate can also be coated by a slot extrusion process, wherein a flat die is situated with the die lips in close proximity to the web of substrate to be coated, resulting in a continuous film of the coating solution evenly distributed across one surface of the sheet, followed by drying in an air dryer at 100° C.

Recording sheets of the present invention can be employed in ink jet printing processes. One embodiment of the present invention is directed to a process which comprises applying an aqueous recording liquid to a recording sheet of the present invention in an imagewise pattern. Another embodiment of the present invention is directed to a printing process which comprises (1) incorporating into an ink jet printing apparatus containing an aqueous ink a recording sheet of the present invention, and (2) causing droplets of the ink to be ejected in an imagewise pattern onto the recording sheet, thereby generating images on the recording sheet. Ink jet printing processes are well known, and are described in, for example, U.S. Pat. Nos. 4,601,777, 4,251,824, 4,410,899, 4,412,224, and 4,532,530, the disclosures of each of which are totally incorporated herein by reference. In a particularly preferred embodiment, the printing apparatus employs a thermal ink jet process wherein the ink in the nozzles is selectively heated in an imagewise pattern, thereby causing droplets of the ink to be ejected in imagewise pattern.

The recording sheets of the present invention can also be used in any other printing or imaging process, such as printing with pen plotters, handwriting with ink pens, offset printing processes, or the like, provided that the ink employed to form the image is compatible with the ink receiving layer of the recording sheet.

Specific embodiments of the invention will now be described in detail. These examples are intended to be illustrative, and the invention is not limited to the materials, conditions, or process parameters set forth in these embodiments. All parts and percentages are by weight unless otherwise indicated.

The optical density measurements recited herein were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

EXAMPLE I

Plain paper sheets (Simpson alkaline sized, carrying no surface treatments, obtained from Simpson Paper Co., Kalamazoo, Mich.) measuring 8.5×11 inches were treated with solutions comprising 2 percent by weight of a pyridinium or piperazinium compound and 98 percent of a solvent (specifically identified for each compound in the table below; meOH=methanol; ratios are by weight) via dip coating and dried in air at 100° C. Subsequent to treatment, each paper sheet had deposited on each side thereof about 100 milligrams of the pyridinium or piperazinium compound. The treated papers, as well as sheets of the Simpson paper which had not been treated with a pyridinium or piperazinium compound, were incorporated into a Xerox® 4020 ink jet printer, and full color prints were generated on each sheet by the printer. The optical density of the cyan, magenta, yellow, and black images were measured. Subsequently, the images were tested for water resistance by washing them at 50° C. for 2 minutes with water followed by again measuring the optical densities of the images. The results were as follows:

| | Black | | | Cyan | | | Magenta | | | Yellow | | |
|---|---|---|---|---|---|---|---|---|---|---|---|---|
| Cmpd. | Bef. | Aft. | % WF | Bef. | Aft. | % WF | Bef. | Aft. | % WF | Bef. | Aft. | % WF |
| none | 1.11 | 0.74 | 67 | 0.97 | 0.72 | 74 | 1.01 | 0.48 | 48 | 0.75 | 0.62 | 83 |
| 1 | 1.22 | 1.21 | 99 | 1.08 | 1.09 | 101 | 1.02 | 1.03 | 101 | 0.75 | 0.73 | 97 |
| 2 | 1.26 | 1.20 | 95 | 1.13 | 1.16 | 103 | 1.05 | 1.07 | 102 | 0.79 | 0.81 | 103 |
| 3 | 1.13 | 1.11 | 98 | 0.86 | 0.83 | 97 | 1.03 | 1.00 | 97 | 0.82 | 0.79 | 96 |
| 4 | 1.07 | 0.98 | 92 | 0.94 | 0.93 | 99 | 1.06 | 0.75 | 71 | 0.78 | 0.75 | 96 |
| 5 | 1.20 | 1.07 | 89 | 1.02 | 0.93 | 91 | 1.13 | 0.77 | 68 | 0.70 | 0.70 | 100 |
| 6 | 1.15 | 0.99 | 86 | 0.97 | 0.89 | 92 | 1.00 | 0.64 | 64 | 0.78 | 0.77 | 99 |
| 7 | 0.83 | 0.82 | 99 | 0.75 | 0.70 | 93 | 0.85 | 0.82 | 96 | 0.66 | 0.61 | 92 |
| 8 | 1.26 | 1.19 | 94 | 0.98 | 1.07 | 109 | 0.99 | 1.01 | 102 | 0.76 | 0.76 | 100 |
| 9 | 1.21 | 1.03 | 85 | 1.06 | 0.96 | 91 | 1.06 | 0.60 | 57 | 0.89 | 0.83 | 93 |

optical density and waterfastness of coated papers printed with Xerox® 4020 ink jet printer

| # | Compound | Solvent |
|---|---|---|
| 1 | Cetyl pyridinium bromide (Aldrich 28,531-5) | meOH |
| 2 | Cetyl pyridinium chloride (Aldrich 85,556-1) | $H_2O$ |
| 3 | 1-dodecyl pyridinium chloride hydrate (Aldrich 27,860-2) | $H_2O$ |
| 4 | 1-(2,3-xylyl) piperazine monohydrochloride (Aldrich 27,518-2) | $H_2O$ |
| 5 | 1-amino-4-methyl piperazinium 2 dihydrochloride (Aldrich A6,513-1) | $H_2O$ |
| 6 | 1-benzyl-3-hydroxypyridinium chloride (Aldrich B2,313-1) | $H_2O$ |
| 7 | 1,1'-diheptyl-4,4'-bipyridinium dibromide (Aldrich 18,085-8) | meOH |
| 8 | N-(lauroyl colamino formyl methyl) pyridinium chloride (Emcol E-607L) | meOH |
| 9 | 1,1'-dibenzyl-4,4'-bipyridinium dichloride (benzyl viologen dichloride, Aldrich 27,184-5) | $H_2O$ |

As the data indicate, the sheets treated with the pyridinium and piperazinium compounds generally exhibited superior waterfastness compared to those sheets not treated with a pyridinium or piperazinium compound.

Other embodiments and modifications of the present invention may occur to those skilled in the art subsequent to a review of the information presented herein; these embodiments and modifications, as well as equivalents thereof, are also included within the scope of this invention.

What is claimed is:

1. An imaged recording sheet which comprises (a) a base sheet; and (b) a coating which comprises (i) a material selected from the group consisting of piperazinium compounds and mixtures thereof; (ii) an optional pigment; and (iii) an optional binder, said coating containing an image applied from an aqueous ink.

2. A recording sheet according to claim 1 wherein the base sheet is paper.

3. A recording sheet according to claim 1 wherein the base sheet is transparent.

4. A recording sheet according to claim 1 wherein the piperazinium compounds are of a formula selected from the group consisting of

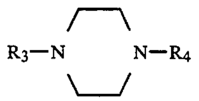

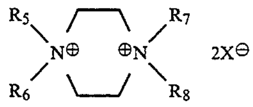

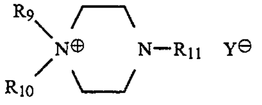

wherein $R_3$, $R_4$, $R_5$, $R_6$, $R_7$, $R_8$, $R_9$, $R_{10}$, and $R_{11}$ are independently selected from the group consisting of hydrogen, alkyl groups, substituted alkyl groups, aryl groups, substituted aryl groups, arylalkyl groups, and substituted arylalkyl groups, and Y is an anion.

5. A recording sheet according to claim 4 wherein $R_3$, $R_4$, $R_5$, $R_6$, $R_7$, $R_8$, $R_9$, $R_{10}$, and $R_{11}$ are independently selected from the group consisting of hydrogen, alkyl groups with from 1 to about 35 carbon atoms, substituted alkyl groups with from 1 to about 25 carbon atoms, aryl groups with from 6 to about 15 carbon atoms, substituted aryl groups with from 6 to about 15 carbon atoms, arylalkyl groups with from 7 to about 25 carbon atoms, and substituted arylalkyl groups with from 7 to about 15 carbon atoms.

6. A recording sheet according to claim 4 wherein the substituents on $R_3$, $R_4$, $R_5$, $R_6$, $R_7$, $R_8$, $R_9$, $R_{10}$, and $R_{11}$ are selected from the group consisting of silyl groups, halide atoms, nitro groups, amine groups, hydroxy groups, ether groups, aldehyde groups, ketone groups, ester groups, amide groups, carboxylic acid groups, and mixtures thereof.

7. An imaged recording sheet which comprises (a) a base sheet; and (b) a coating which comprises (i) a material selected from the group consisting of pyridinium or piperazinium compounds selected from the group consisting of 1-(carboxymethyl) pyridinium chloride, 1-(carboxymethyl) pyridinium chloride hydrazide, 1-(3-sulfopropyl) pyridinium hydroxide, 1-(3-nitrobenzyloxymethyl) pyridinium chloride, 1-dodecyl pyridinium chloride monohydrate, N-(lauroyl colamino formyl methyl) pyridinium chloride, N-(stearoyl colamine formyl methyl) pyridinium chloride, 1-hexadecyl pyridinium bromide monohydrate, 1-hexadecyl pyridinium chloride monohydrate, 2-chloro-1-methyl pyridinium iodide, 2-pyridine aldoximel-methyl methane sulfonate, 2-pyridine aldoxime-1-methyl chloride, 2-[4-(dimethyl amino) styryl]1-ethylpyridinium iodide, 1-ethyl-3-hydroxy pyridinium bromide, 1-benzyl-3-hydroxy pyridinium chloride, 1,4 dimethyl pyridinium iodide, 1-ethyl-4-(methoxy carbonyl) pyridinium iodide, 1-ethyl-4-phenyl pyridinium iodide, 4-phenyl-1-propyl pyridinium iodide, 1-heptyl-4-(4-pyridyl) pyridinium bromide, 1-docosylo-4-(4 hydroxystyryl) pyridinium bromide, 1,1 '-dimethyl-4-4'-bipyridinium dichloride, 1,1'-diethyl-4-4'-bipyridinium dibromide, 1,1'-dibenzyl-4,4'-bipyridinium dichloride, 1,1'-diheptyl-4,4'-bipyridinium dibromide, 1-amino-4-methyl piperazine dihydrochloride monohydrate, 1-(3-chloropropyl)piperazine dihydrochloride monohydrate, 1-(2,3-xylyl) piperazine monohydrochloride, 1,1-dimethyl-4-phenyl piperazinium iodide, and mixtures thereof; (ii) an optional pigment; and (iii) an optional binder, said coating containing an image applied from an aqueous ink.

8. A recording sheet according to claim 1 wherein the piperazinium compound is present in an amount of from about 1 to about 25 percent by weight of the base sheet.

9. A recording sheet according to claim 1 wherein the piperazinium compound is present in an amount of from about 2 to about 10 percent by weight of the base sheet.

10. A recording sheet according to claim 1 wherein the piperazinium compound is present in an amount of from about 1 to about 10 grams per square meter of the base sheet surface to which it is applied.

11. A method of using a recording sheet which comprises applying an aqueous recording liquid in an imagewise pattern to a recording sheet for receiving printed images which comprises (a) a base sheet; and (b) a coating which comprises (i) a material selected from the group consisting of piperazinium compounds and mixtures thereof; (ii) an optional pigment; and (iii) an optional binder.

12. A method of using a recording sheet in a printing process which comprises (1) incorporating into an ink jet printing apparatus containing an aqueous ink a recording sheet which comprises (a) a base sheet; and (b) a coating which comprises (i) a material selected from the group consisting of piperazinium compounds and mixtures thereof; (ii) an optional pigment; and (iii) an optional binder, and (2) causing droplets of the ink to be ejected in an imagewise pattern onto the recording sheet, thereby generating images on the recording sheet.

13. A method of using according to claim 12 wherein the base sheet is paper.

14. A method of using according to claim 12 wherein the base sheet is transparent.

15. A method of using according to claim 12 wherein the piperazinium compounds are of a formula selected from the group consisting of

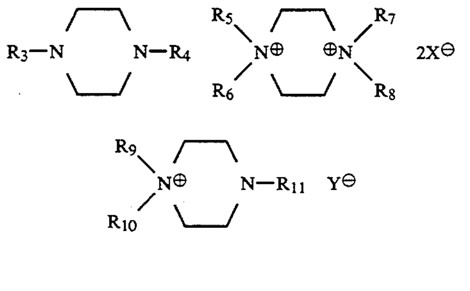

wherein $R_3$, $R_4$, $R_5$, $R_6$, $R_7$, $R_8$, $R_9$, $R_{10}$, and $R_{11}$ are independently selected from the group consisting of hydrogen, alkyl groups, substituted alkyl groups, aryl groups, substituted aryl groups, arylalkyl groups, and substituted arylalkyl groups, and Y is an anion.

16. A method of using according to claim 15 wherein $R_3$, $R_4$, $R_5$, $R_6$, $R_7$, $R_8$, $R_9$, $R_{10}$, and $R_{11}$ are independently selected from the group consisting of hydrogen, alkyl groups with from 1 to about 35 carbon atoms, substituted alkyl groups with from 1 to about 25 carbon atoms, aryl groups with from 6 to about 15 carbon atoms, substituted aryl groups with from 6 to about 15 carbon atoms, arylalkyl groups with from 7 to about 25 carbon atoms, and substituted arylalkyl groups with from 7 to about 15 carbon atoms.

17. A method of using according to claim 15 wherein the substituents on $R_3$, $R_4$, $R_5$, $R_6$, $R_7$, $R_8$, $R_9$, $R_{10}$, and $R_{11}$ are selected from the group consisting of silyl groups, halide atoms, nitro groups, amine groups, hydroxy groups, ether groups, aldehyde groups, ketone groups, ester groups, amide groups, carboxylic acid groups, and mixtures thereof.

18. A method of using a recording sheet in a printing process which comprises (1)incorporating into an ink jet printing apparatus containing an aqueous ink a recording sheet for receiving printed images which comprises (a) a base sheet; and (b) a coating which comprises (i) a material selected from the group consisting of pyridinium or piperazinium compounds selected from the group consisting of 1-(carboxymethyl) pyridinium chloride, 1-(carboxymethyl) pyridinium chloride hydrazide, 1-(3-sulfopropyl) pyridinium hydroxide, 1-(3-nitrobenzyloxymethyl) pyridinium chloride, 1-dodecyl pyridinium chloride monohydrate, N-(lauroyl colamino formyl methyl) pyridinium chloride, N-(stearoyl colamine formyl methyl) pyridinium chloride, 1-hexadecyl pyridinium bromide monohydrate, 1-hexadecyl pyridinium chloride monohydrate, 2-chloro-1-methyl pyridinium iodide, 2-pyridine aldoxime-1-methyl methane sulfonate, 2-pyridine aldoxime-1-methyl chloride, 2-[4-(dimethyl amino) styryl]1-ethylpyridinium iodide, 1-ethyl-3-hydroxy pyridinium bromide, 1-benzyl-3-hydroxy pyridinium chloride, 1,4 dimethyl pyridinium iodide, 1-ethyl-4-(methoxy carbonyl) pyridinium iodide, 1-ethyl-4-phenyl pyridinium iodide, 4-phenyl-1-propyl pyridinium iodide, 1-heptyl-4-(4-pyridyl) pyridinium bromide, 1-docosyl-4-(4 hydroxystyryl) pyridinium bromide, 1,1'-dimethyl-4-4'-bipyridinium dichloride, 1,1'-diethyl-4-4'-bipyridinium dibromide, 1,1'-dibenzyl-4,4'-bipyridinium dichloride, 1,1'-diheptyl-4,4'-bipyridinium dibromide, 1-amino-4-methyl piperazine dihydrochloride monohydrate, 1-(3-chloropropyl)-piperazine dihydrochloride monohydrate, 1-(2,3-xylyl) piperazine monohydrochloride, 1,1-dimethyl-4-phenyl piperazinium iodide, and mixtures thereof; (ii) an optional pigment; and (iii) an optional binder, and (2) causing droplets of the ink to be ejected in an imagewise pattern onto the recording sheet, thereby generating images on the recording sheet.

19. A method of using according to claim 12 wherein the piperazinium compound is present in an amount of from about 1 to about 25 percent by weight of the base sheet.

20. A method of using according to claim 12 wherein the piperazinium compound is present in an amount of from about 2 to about 10 percent by weight of the base sheet.

21. A method of using according to claim 12 wherein the piperazinium compound is present in an amount of from about 1 to about 10 grams per square meter of the base sheet surface to which it is applied.

22. A method of using according to claim 12 wherein the printing apparatus employs a thermal ink jet process wherein the ink in the nozzles is selectively heated in an imagewise pattern, thereby causing droplets of the ink to be ejected in imagewise pattern.

23. An imaged recording sheet which comprises (a) a base sheet; and (b) a coating which comprises (i) a material selected from the group consisting of (A) pyridinium compounds of the formula

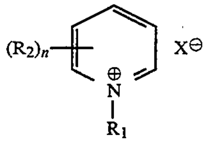

wherein $R_1$ is a moiety bound to the nitrogen atom and is selected from the group consisting of hydrogen, alkyl groups, substituted alkyl groups, aryl groups, substituted aryl groups, arylalkyl groups, and substituted arylalkyl groups, $R_2$ is a moiety bound to the ring at an atom other than nitrogen and is selected from the group consisting of hydrogen, alkyl groups, substituted alkyl groups, aryl groups, substituted aryl groups, arylalkyl groups, and substituted arylalkyl groups, n represents the number of $R_2$ substituents on the ring, and X is an anion, and (B) mixtures thereof; (ii) an optional pigment; and (iii) an optional binder, wherein the base sheet is treated with a composition containing the pyridinium compound, an optional pigment, and an optional binder in relative amounts such that the pyridinium compound is present in an amount of at least about 20 percent by weight, said coating containing an image applied from an aqueous ink.

24. An imaged recording sheet which comprises (a) a paper base sheet; and (b) a coating which comprises (i) a material selected from the group consisting of (A) pyridinium compounds of the formula

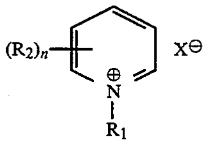

wherein $R_1$ is a moiety bound to the nitrogen atom and is selected from the group consisting of hydrogen, alkyl groups, substituted alkyl groups, aryl groups, substituted aryl groups, arylalkyl groups, and substituted arylalkyl groups, $R_2$ is a moiety bound to the ring at an atom other than nitrogen and is selected from the group consisting of hydrogen, alkyl groups, substituted alkyl groups, aryl groups, substituted aryl groups, arylalkyl groups, and substituted arylalkyl groups, n represents the number of $R_2$ substituents on the ring, and X is an anion, and (B) mixtures thereof; (ii) an optional pigment; and (iii) an optional binder, said coating containing an image applied from an aqueous ink.

25. A recording sheet according to claim 23 wherein $R_1$ is selected from the group consisting of hydrogen, alkyl groups with from 1 to about 35 carbon atoms, substituted alkyl groups with from 1 to about 25 carbon atoms, aryl groups with from 6 to about 15 carbon atoms, substituted aryl groups with from 6 to about 25 carbon atoms, arylalkyl groups with from 7 to about 15 carbon atoms, and substituted arylalkyl groups with from 7 to about 15 carbon atoms, and $R_2$ is selected from the group consisting of hydrogen, alkyl groups with from 1 to about 35 carbon atoms, substituted alkyl groups with from 1 to about 25 carbon atoms, aryl groups with from 6 to about 15 carbon atoms, substituted aryl groups with from 6 to about 15 carbon atoms, arylalkyl groups with from 7 to about 15 carbon atoms, and substituted arylalkyl groups with from 7 to about 15 carbon atoms.

26. A recording sheet according to claim 25 wherein the substituents on $R_1$ and $R_2$ are selected from the group consisting of silyl groups, halide atoms, nitro groups, amine groups, hydroxy groups, ether groups, aldehyde groups, ketone groups, ester groups, amide groups, carboxylic acid groups, and mixtures thereof.

27. A recording sheet according to claim 24 wherein $R_1$ is selected from the group consisting of hydrogen, alkyl groups with from 1 to about 35 carbon atoms, substituted alkyl groups with from 1 to about 25 carbon atoms, aryl groups with from 6 to about 15 carbon atoms, substituted aryl groups with from 6 to about 25 carbon atoms, arylalkyl groups with from 7 to about 15 carbon atoms, and substituted arylalkyl groups with from 7 to about 15 carbon atoms, and $R_2$ is selected from the group consisting of hydrogen, alkyl groups with from 1 to about 35 carbon atoms, substituted alkyl groups with from 1 to about 25 carbon atoms, aryl groups with from 6 to about 15 carbon atoms, substituted aryl groups with from 6 to about 15 carbon atoms, arylalkyl groups with from 7 to about 15 carbon atoms, and substituted arylalkyl groups with from 7 to about 15 carbon atoms.

28. A recording sheet according to claim 27 wherein the substituents on $R_1$ and $R_2$ are selected from the group consisting of silyl groups, halide atoms, nitro groups, amine groups, hydroxy groups, ether groups, aldehyde groups, ketone groups, ester groups, amide groups, carboxylic acid groups, and mixtures thereof.

29. A recording sheet according to claim 23 wherein the pyridinium compound is present in an amount of from about 1 to about 25 percent by weight of the base sheet.

30. A recording sheet according to claim 24 wherein the pyridinium compound is present in an amount of from about 1 to about 25 percent by weight of the base sheet.

31. A recording sheet according to claim 23 wherein the pyridinium compound is present in an amount of from about 1 to about 10 grams per square meter of the base sheet surface to which it is applied.

32. A recording sheet according to claim 24 wherein the pyridinium compound is present in an amount of from about 1 to about 10 grams per square meter of the base sheet surface to which it is applied.

33. A method of using a recording sheet which comprises applying an aqueous recording liquid in an imagewise pattern to a recording sheet which comprises (a) a base sheet; and (b) a coating which comprises (i) a material selected from the group consisting of (A) pyridinium compounds of the formula

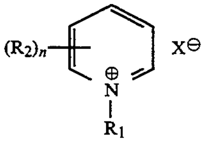

wherein $R_1$ is a moiety bound to the nitrogen atom and is selected from the group consisting of hydrogen, alkyl groups, substituted alkyl groups, aryl groups, substituted aryl groups, arylalkyl groups, and substituted arylalkyl groups, $R_2$ is a moiety bound to the ring at an atom other than nitrogen and is selected from the group consisting of hydrogen, alkyl groups, substituted alkyl groups, aryl groups, substituted aryl groups, arylalkyl groups, and substituted arylalkyl groups, n represents the number of $R_2$ substituents on the ring, and X is an anion, and (B) mixtures thereof; (ii) an optional pigment; and (iii) an optional binder, wherein the base sheet is treated with a composition containing the pyridinium compound, an optional pigment, and an optional binder in relative amounts such that the pyridinium compound is present in an amount of at least about 20 percent by weight.

34. A method of using a recording sheet which comprises applying an aqueous recording liquid in an imagewise pattern to a recording sheet which comprises (a) a paper base sheet; and (b) a coating which comprises (i) a material selected from the group consisting of (A) pyridinium compounds of the formula

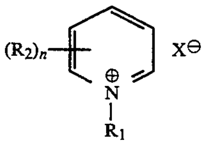

wherein $R_1$ is a moiety bound to the nitrogen atom and is selected from the group consisting of hydrogen, alkyl groups, substituted alkyl groups, aryl groups, substituted aryl groups, arylalkyl groups, and substituted arylalkyl groups, $R_2$ is a moiety bound to the ring at an atom other than nitrogen and is selected from the group consisting of hydrogen, alkyl groups, substituted alkyl groups, aryl groups, substituted aryl groups, arylalkyl groups, and substituted arylalkyl groups, n represents the number of $R_2$ substituents on the ring, and X is an anion, and (B) mixtures thereof; (ii) an optional pigment; and (iii) an optional binder.

35. A method of using a recording sheet in a printing process which comprises (1) incorporating into an ink jet printing apparatus containing an aqueous ink a recording sheet which comprises (a) a base sheet; and (b) a coating which comprises (i) a material selected from the group consisting of (A) pyridinium compounds of the formula

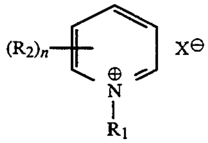

wherein $R_1$ is a moiety bound to the nitrogen atom and is selected from the group consisting of hydrogen, alkyl groups, substituted alkyl groups, aryl groups, substituted aryl groups, arylalkyl groups, and substituted arylalkyl groups, $R_2$ is a moiety bound to the ring at an atom other than nitrogen and is selected from the group consisting of hydrogen, alkyl groups, substituted alkyl groups, aryl groups, substituted aryl groups, arylalkyl groups, and substituted arylalkyl groups, n represents the number of $R_2$ substituents on the ring, and X is an anion, and (B) mixtures thereof; (ii) an optional pigment; and (iii) an optional binder, wherein the base sheet is treated with a composition containing the pyridinium compound, an optional pigment and an optional binder in relative amounts such that the pyridinium compound is present in an amount of at least about 20 percent by weight, and (2) causing droplets of the ink to be ejected in an imagewise pattern onto the recording sheet, thereby generating images on the recording sheet.

36. A method of using a recording sheet in a printing process which comprises (1) incorporating into an ink jet printing apparatus containing an aqueous ink a recording sheet which comprises (a) a paper base sheet; and (b) a coating which comprises (i) a material selected from the group consisting of (A) pyridinium compounds of the formula

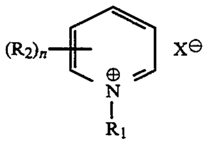

wherein $R_1$ is a moiety bound to the nitrogen atom and is selected from the group consisting of hydrogen, alkyl groups, substituted alkyl groups, aryl groups, substituted aryl groups, arylalkyl groups, and substituted arylalkyl groups, $R_2$ is a moiety bound to the ring at an atom other than nitrogen and is selected from the group consisting of hydrogen, alkyl groups, substituted alkyl groups, aryl groups, substituted aryl groups, arylalkyl groups, and substituted arylalkyl groups, n represents the number of $R_2$ substituents on the ring, and X is an anion, and (B) mixtures thereof; (ii) an optional pigment; and (iii) an optional binder, and (2) causing droplets of the ink to be ejected in an imagewise pattern onto the recording sheet, thereby generating images on the recording sheet.

* * * * *